(No Model.)
T. C. BOOTH & E. G. RUTTY.
GLOVE FASTENER.
No. 487,822. Patented Dec. 13, 1892.
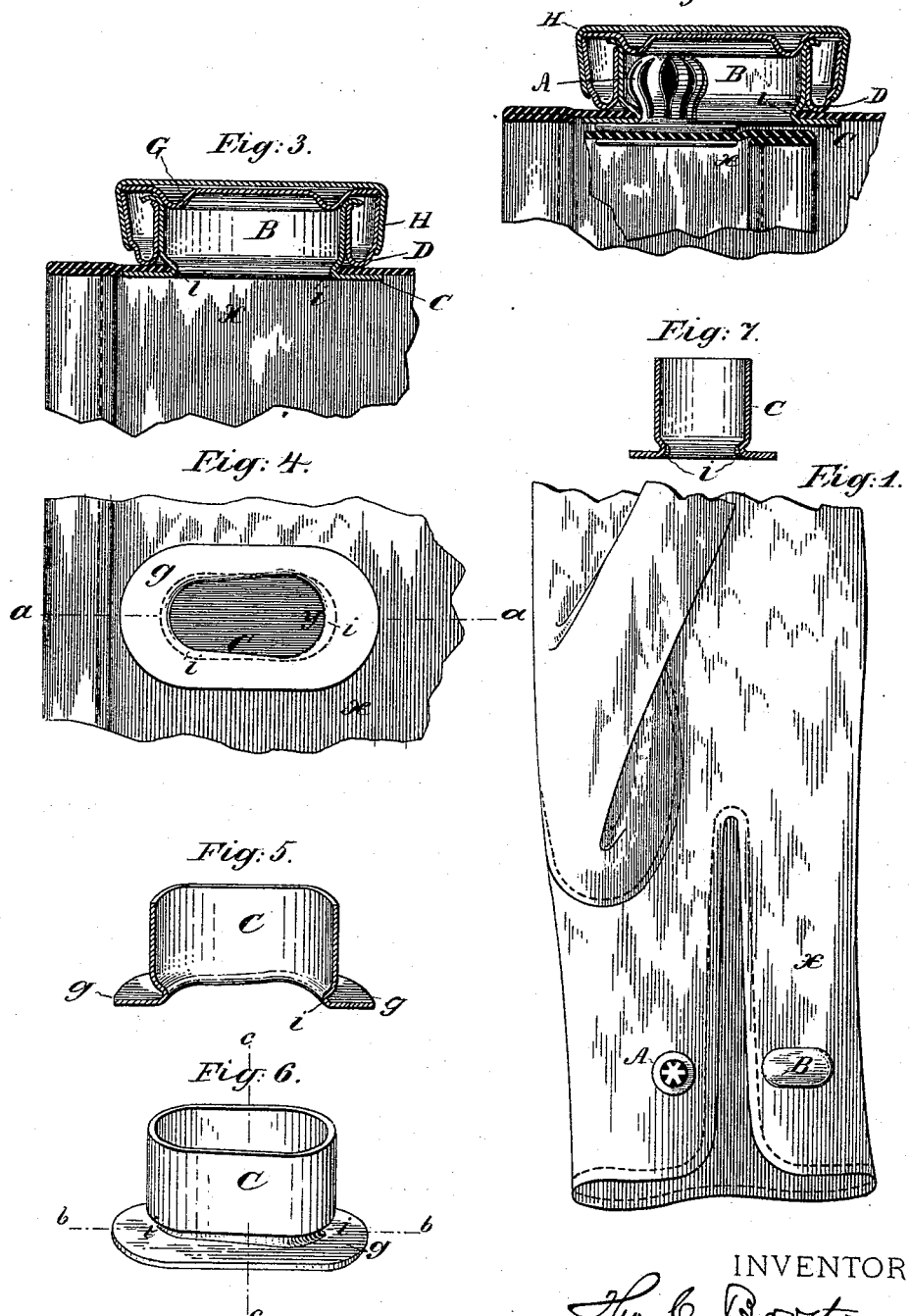
WITNESSES:
Harry E. Browne
Mamie Strickhammer
INVENTORS:
Thos. C. Booth
Ernest G. Rutty
By A. Bell Malcomson
their Attorney.

UNITED STATES PATENT OFFICE.

THOMAS C. BOOTH AND ERNEST G. RUTTY, OF NEW YORK, N. Y.

GLOVE-FASTENER.

SPECIFICATION forming part of Letters Patent No. 487,822, dated December 13, 1892.

Application filed June 22, 1892. Serial No. 437,586. (No model.)

*To all whom it may concern:*

Be it known that we, THOMAS C. BOOTH and ERNEST GEORGE RUTTY, of the city of New York, in the county and State of New York, have made certain new and useful Improvements in Glove-Fasteners; and we hereby declare the following to be a full and clear description thereof, reference being had to the accompanying drawings.

This invention relates to that class of fastenings used at the wrist of gloves, composed of a stud on one side and a covered socket on the other, and is designed to provide a fastening which will remain secured when there is no tension on the parts and will tend to become more secure when the pressure on it is increased.

In the drawings, Figure 1 is a view of portion of a glove with our improved fastening attached. Fig. 2 is a longitudinal section through the glove and fastening through line *a a* of Fig. 4, showing the stud in position in the socket. Fig. 3 is the same as Fig. 2 without the stud. Fig. 4 is a plan view showing the face or flange of the eyelet and opening in same. Fig. 5 is a longitudinal section of the eyelet through *b b* of Fig. 6. Fig. 6 is a perspective of the eyelet. Fig. 7 is a cross-section of the eyelet through line *c c*, Fig. 6.

In the construction of fastenings for the wrists of gloves where the stud is round and solid and the eyelet or socket is round the pressure from a distention of the wrist will cause the stud to leave the socket, and in order to overcome this defect various means have been devised, one of which consists of making the stud so that it is hollow and its sides will give or be depressed when entering a circular socket or eyelet and slightly distend when in place, reliance being placed on the resiliency of the parts to keep the fastening together. Such fastenings have also been made comprising a solid stud with enlarged head on one side and a plate with a circular hole therein and a slot from one side of a smaller size and into which the shank of the stud will pass when under tension. We have found in practice that all of these devices are defective and will soon wear loose and either drop apart and become unfastened when there is no tension, as in the case of an undersized wrist, or readily pull apart when under any pressure. Our improved fastening is constructed so as to overcome these defects.

In the drawings, A is the stud portion of the fastening, which is preferably made hollow and adapted to spring or be compressed slightly when entering the socket. B is the eyelet or socket which receives the stud and is of a novel shape and construction, as shown in the drawings. The fabric or glove is designated by *x*. The shape of the opening in the sockets heretofore used for this purpose has been circular; but we have found that a great advantage is gained by changing the shape of this opening, and in our improved fastening such opening is ovate in form, the broadest end being farthest from the glove-slit at the wrist. The broad end of this opening at Y is of a size slightly smaller than the largest part of the head of the stud A. The interior walls of the socket B surrounding the ovate opening are adapted to be slightly distended by the introduction of the stud and its movement in the socket. This allows for the head of the stud to always fit snugly against the sides of the socket.

The socket B is constructed of four pieces of metal. One piece composes the eyelet C, which is oblong and is crimped, so as to form a flange *g* and rim *i* and form an opening in the flange which will be smaller at one end and ovate in outline, as shown in Fig. 4.

D is the interior tube or collet, which is also oblong and corresponds in size and form with the barrel of the eyelet, but not with the ovate opening.

G is a guide-plate, which serves to turn the top of the tube of the eyelet when it is pressed into position, and H is an exterior cap.

What we claim as our invention is—

In a socket for a glove-fastening, the combination, with an eyelet consisting of a flattened or oval tube having a flange around its end for securing it to the glove and having its side walls contracted at the junction with said flange, whereby an ovate opening of smaller area than the cross-section of the tube is formed for the reception of the stud, of an oblong ring or collet D, arranged around said flattened tubular portion of the eyelet, an oval anvil-plate arranged over the open end of said tube, and a cap-plate arranged over said anvil-plate and embracing said tube, said cap-plate having an oblong flattened form corresponding to the form of said tube, substantially as set forth.

T. C. BOOTH.
E. G. RUTTY.

Witnesses:
A. BELL MALCOMSON,
THOMAS F. COEN.